(12) United States Patent
Liu

(10) Patent No.: US 9,571,424 B2
(45) Date of Patent: Feb. 14, 2017

(54) METHOD AND APPARATUS FOR COMPENSATING FOR VOICE PACKET LOSS

(71) Applicant: Huawei Technologies Co., Ltd., Shenzhen, Guangdong (CN)

(72) Inventor: Jinhua Liu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 14/598,998

(22) Filed: Jan. 16, 2015

(65) Prior Publication Data

US 2015/0131429 A1    May 14, 2015

Related U.S. Application Data

(63) Continuation of application No. PCT/CN2013/075057, filed on May 2, 2013.

(30) Foreign Application Priority Data

Jul. 18, 2012  (CN) .......................... 2012 1 0248685

(51) Int. Cl.
*H04L 12/26*   (2006.01)
*H04L 12/939*   (2013.01)
(Continued)

(52) U.S. Cl.
CPC .......... *H04L 49/557* (2013.01); *G10L 19/005* (2013.01); *H04L 1/0061* (2013.01); *H04L 1/208* (2013.01); *H04L 65/1083* (2013.01)

(58) Field of Classification Search
CPC ............................ H04L 12/2647; H04L 47/34
(Continued)

(56) References Cited

U.S. PATENT DOCUMENTS 6,584,104 B1 *  6/2003  McGowan .......... H04L 12/6418
                                                370/394
6,961,697 B1 * 11/2005  Kapilow ............... G10L 19/005
                                                704/201
(Continued)

FOREIGN PATENT DOCUMENTS

CN    1901431 A    1/2007
CN    1984203 A    6/2007
(Continued)

OTHER PUBLICATIONS

Pei-ming Wang, et al., "Packet Loss Concealment Techniques for VoIP", Computer Technology and Development, vol. 16, No. 7, Jul. 2006, 4 pages.

(Continued)

*Primary Examiner* — Dmitry H Levitan

(57) ABSTRACT

Embodiments of the present invention disclose a method and an apparatus for compensating for a voice packet loss, which are used to compensate for a lost voice packet. The method in the embodiments of the present invention includes: extracting a pitch period from received voice data when a lost frame is detected; calculating a backward phase of a last received frame of normal voice data; calculating a forward phase of the lost frame according to the backward phase; capturing, from the received data, data whose last frame is with a same phase as the forward phase, as compensation data.

9 Claims, 4 Drawing Sheets

(51) Int. Cl.
  *H04L 1/00* (2006.01)
  *H04L 1/20* (2006.01)
  *H04L 29/06* (2006.01)
  *G10L 19/005* (2013.01)

(58) Field of Classification Search
  USPC .......................... 370/216; 704/210, 215, 219
  See application file for complete search history.

(56) References Cited

U.S. PATENT DOCUMENTS

| | | | | |
|---|---|---|---|---|
| 7,137,626 | B2* | 11/2006 | Lam | G10L 19/005 370/216 |
| 7,711,554 | B2* | 5/2010 | Mori | G10L 19/005 704/211 |
| 7,869,992 | B2* | 1/2011 | Raifel | G10L 19/005 704/219 |
| 8,000,960 | B2* | 8/2011 | Chen | G10L 19/005 341/143 |
| 8,185,388 | B2* | 5/2012 | Gao | G10L 19/005 704/228 |
| 8,255,213 | B2* | 8/2012 | Yoshida | G10L 19/005 704/221 |
| 2003/0163304 | A1 | 8/2003 | Mekuria et al. | |
| 2003/0220787 | A1 | 11/2003 | Svensson et al. | |
| 2004/0017811 | A1 | 1/2004 | Lam | |
| 2006/0182086 | A1 | 8/2006 | Dowdal et al. | |
| 2010/0049510 | A1* | 2/2010 | Zhan | G10L 25/90 704/219 |

FOREIGN PATENT DOCUMENTS

| | | |
|---|---|---|
| CN | 101887723 A | 11/2010 |
| CN | 101894558 A | 11/2010 |
| CN | 102833037 A | 12/2012 |
| JP | 2001-228896 A | 8/2001 |
| WO | WO 2009/155803 A1 | 12/2009 |

OTHER PUBLICATIONS

Ondria J. Wasem, et al., "The Effect of Waveform Substitution on the Quality of PCM Packet Communications", IEEE Transactions on Acoustics, Speech, and Signal Processong, vol. 36, No. 3, Mar. 1988, p. 342-348.

* cited by examiner

METHOD AND APPARATUS FOR COMPENSATING FOR VOICE PACKET LOSS

CROSS-REFERENCE TO RELATED APPLICATIONS

This application is a continuation of International Application No. PCT/CN2013/075057, filed on May 2, 2013, which claims priority to Chinese Patent Application No. 201210248685.2, filed on Jul. 18, 2012, both of which are hereby incorporated by reference in their entireties.

TECHNICAL FIELD

The present invention relates to the field of communications technologies, and in particular, to a method and an apparatus for compensating for a voice packet loss.

BACKGROUND

In a transmission process on an Internet Protocol (IP, Internet Protocol) network, a voice packet is generally transmitted in an unreliable transmission mode to ensure real-time data transmission. For example, the use of a User Datagram Protocol (UDP, User Datagram Protocol) transmission mode makes a packet loss inevitable. How to reduce deterioration of voice quality caused by a network packet loss is an important research topic in the field of voice data transmission over IP networks.

In the prior art, the following two solutions are generally used:

Solution 1 is a packet redundancy technology: Multiple copies of a same packet are sent at a transmit end; and original data can be completely recovered at a receive end, provided that one copy of the data is not lost.

Solution 2 is a technology of synthesizing a previous frame and a next frame: According to a frame before a packet loss and a frame after the packet loss, two frames of predicted data are separately generated by using a linear prediction method, and then transitive processing of hybrid weighting and smooth interpolation is performed for the two frames of data.

However, in the prior art solution 1, it is required to send multiple copies of a same packet, and consequently network bandwidth consumption multiplies, and network performance may deteriorate. In addition, a network packet loss may occur abruptly and last for a continuous period, and the multiple sent copies of data may be all lost. As a result, the lost packet still cannot be recovered at a receive end, thereby degrading voice quality and further causing a delay due to the packet loss. While in the prior art solution 2, a compensation packet is obtained by synthesizing a previous frame and a next frame, and compensation can be performed only when the next frame of data is received. If consecutive packet losses occur, the compensation is ineffective, thereby causing a relatively long delay.

SUMMARY

Embodiments of the present invention provide a method and an apparatus for compensating for a voice packet loss, so as to compensate for a lost voice packet.

An embodiment of the present invention provides a method for compensating for a voice packet loss, where the method includes: extracting a pitch period from received voice data when a lost frame is detected; calculating a backward phase of a last received frame of normal voice data, where the backward phase is a time interval between a frame trailer of the last received frame and a wave crest of a last pitch period; calculating a forward phase of the lost frame, where the forward phase is a time interval between a frame header of the lost frame and a wave crest of a first pitch period and is a difference between the pitch period and the backward phase; and capturing, from the received data, data whose last frame is with a same phase as the forward phase, as compensation data.

An embodiment of the present invention provides an apparatus for compensating for a voice packet loss, where the apparatus includes: an extracting unit, configured to extract a pitch period from received voice data when a lost frame is detected; a calculating unit, configured to calculate a backward phase of a last received frame of normal voice data, where the backward phase is a time interval between a frame trailer of the last received frame and a wave crest of a last pitch period, and the calculating unit is further configured to calculate a forward phase of the lost frame, where the forward phase is a time interval between a frame header of the lost frame and a wave crest of a first pitch period and is a difference between the pitch period and the backward phase; and a capturing unit, configured to capture, from the received data, data whose last frame is with a same phase as the forward phase, as compensation data.

It may be learned from the foregoing technical solutions that the embodiments of the present invention have the following advantages: Once a frame loss occurs, a pitch period is extracted from received voice data; a backward phase of a last received frame of normal data is calculated, where the backward phase is equal to a time difference between a last wave crest and a frame trailer; a forward phase of a lost frame is calculated, where the forward phase is a time interval between a frame header of the lost frame and a wave crest of a first pitch period and is equal to a difference between the pitch period and the backward phase; and data whose last frame is with a same phase as the forward phase is captured from the received normal data as compensation data. As can be seen in this embodiment, based on a gradual change feature of voice, it is roughly considered that there is a stable trend in changes to pitch periods of adjacent periods. In view of this, the forward phase of the lost frame is estimated, and then the compensation data is obtained by means of phase shifting, so that the compensation data is closer to lost data, which reduces voice data distortion without introducing a delay.

DETAILED DESCRIPTION

Embodiments of the present invention provide a method and an apparatus for compensating for a voice packet loss, so as to perform predicted compensation for a lost voice packet by taking advantage of a time redundancy feature. The method and the apparatus are separately described in detail in the following.

Figure 1:
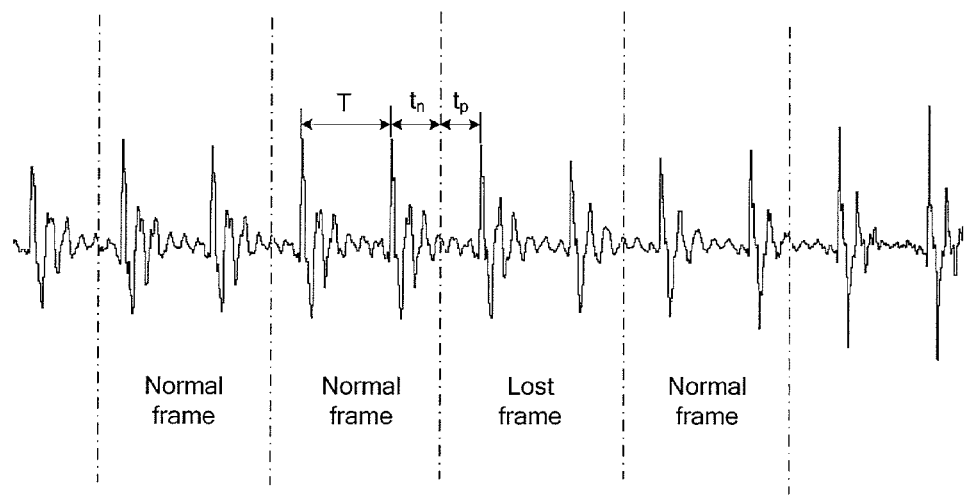
FIG. 1 is a schematic diagram of a voice waveform according to an embodiment of the present invention.

FIG. 1 is a schematic diagram of a voice waveform according to an embodiment of the present invention, where a forward phase tp shown in the figure is a time interval between a frame header of voice data and a wave crest of a first pitch period T, and a backward phase to is a time interval between a frame trailer of the last received frame and a wave crest of a last pitch period T.

Voice articulated by a speaking person changes continuously and gradually in frequency and amplitude. Voice data has a great amount of repeated data over time, and this is called a time redundancy feature. In the method for compensating for a voice packet loss in the embodiments of the present invention, predicted compensation is performed for a lost packet by using this feature. Based on a gradual change feature of voice, it is roughly considered that pitch periods of adjacent periods are the same or their trends of change are stable, so that compensation data closest to a lost frame is obtained.

Figure 2:
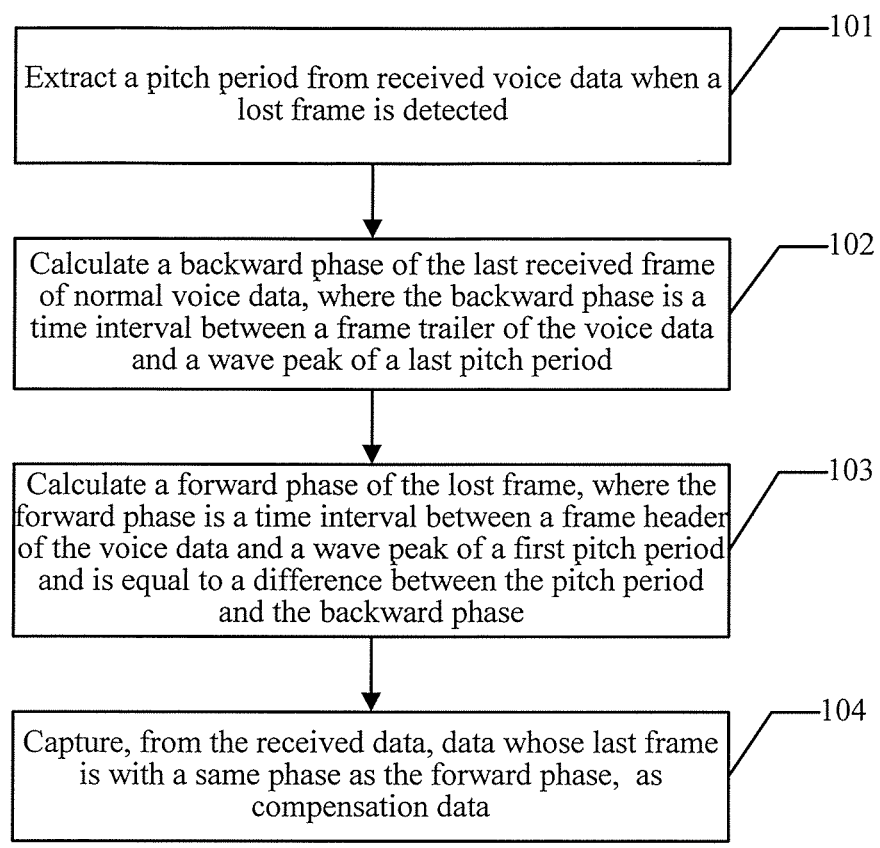
FIG. 2 is a schematic diagram of a method for compensating for a voice packet loss according to an embodiment of the present invention.

Referring to FIG. 2, a method for compensating for a voice packet loss according to an embodiment of the present invention includes:

101. Extract a pitch period from received voice data when a lost frame is detected.

In a data transmission process, when a device detects a lost frame, the device extracts a pitch period T from received normal voice data, and detects whether a voice data frame is lost. A packet loss detection method is based on sequence number continuity and is a conventional technology. Details are not described herein again.

102. Calculate a backward phase of a last received frame of normal voice data, where the backward phase is a time interval between a frame trailer of the last received frame and a wave crest of a last pitch period.

In this embodiment, tn in FIG. 1 is a backward phase, and the backward phase is a time interval between a frame trailer of voice data and a wave crest of a last pitch period T. Therefore, calculating the backward phase tn is to calculate a time interval between a frame trailer of the last frame of the normal voice data in the received voice data and the wave crest of the last pitch period T.

103. Calculate a forward phase of the lost frame, where the forward phase is a time interval between a frame header of the lost frame and a wave crest of a first pitch period and is equal to a difference between the pitch period and the backward phase:

$$tp = T - tn$$

104. Capture, from the received data, data whose last frame is with a same phase as the forward phase, as compensation data.

To make the compensation data closer to lost data, data that is closest to the lost data and whose data frame phase is the forward phase tp is captured from the received data as the compensation data. That is, data whose phase of a last frame is the forward phase tp is captured from the received data as the compensation data.

It should be noted that the compensation data is stored in a data buffer as normally received data. If consecutive packet losses occur subsequently, the compensation data may be taken as benchmark data for obtaining compensation data according to the foregoing steps 101 to 104.

In this embodiment of the present invention, once a frame loss occurs, a pitch period is extracted from received voice data; a backward phase of a last received frame of normal data is calculated, where the backward phase is equal to a time difference between a last wave crest and a frame trailer; a forward phase of a lost frame is calculated, where the forward phase is a time interval between a frame header of the lost frame and a wave crest of a first pitch period and is equal to a difference between the pitch period and the backward phase; and data whose last frame is with a same phase as the forward phase is captured from the received normal data as compensation data. As can be seen in this embodiment, based on a gradual change feature of voice, it is roughly considered that pitch periods of adjacent periods are the same or their trends of change are stable. In view of this, the forward phase of the lost frame is estimated, and then the compensation data is obtained by means of phase shifting, so that the compensation data is closer to lost data, which reduces voice data distortion without introducing a delay.

Figure 3:
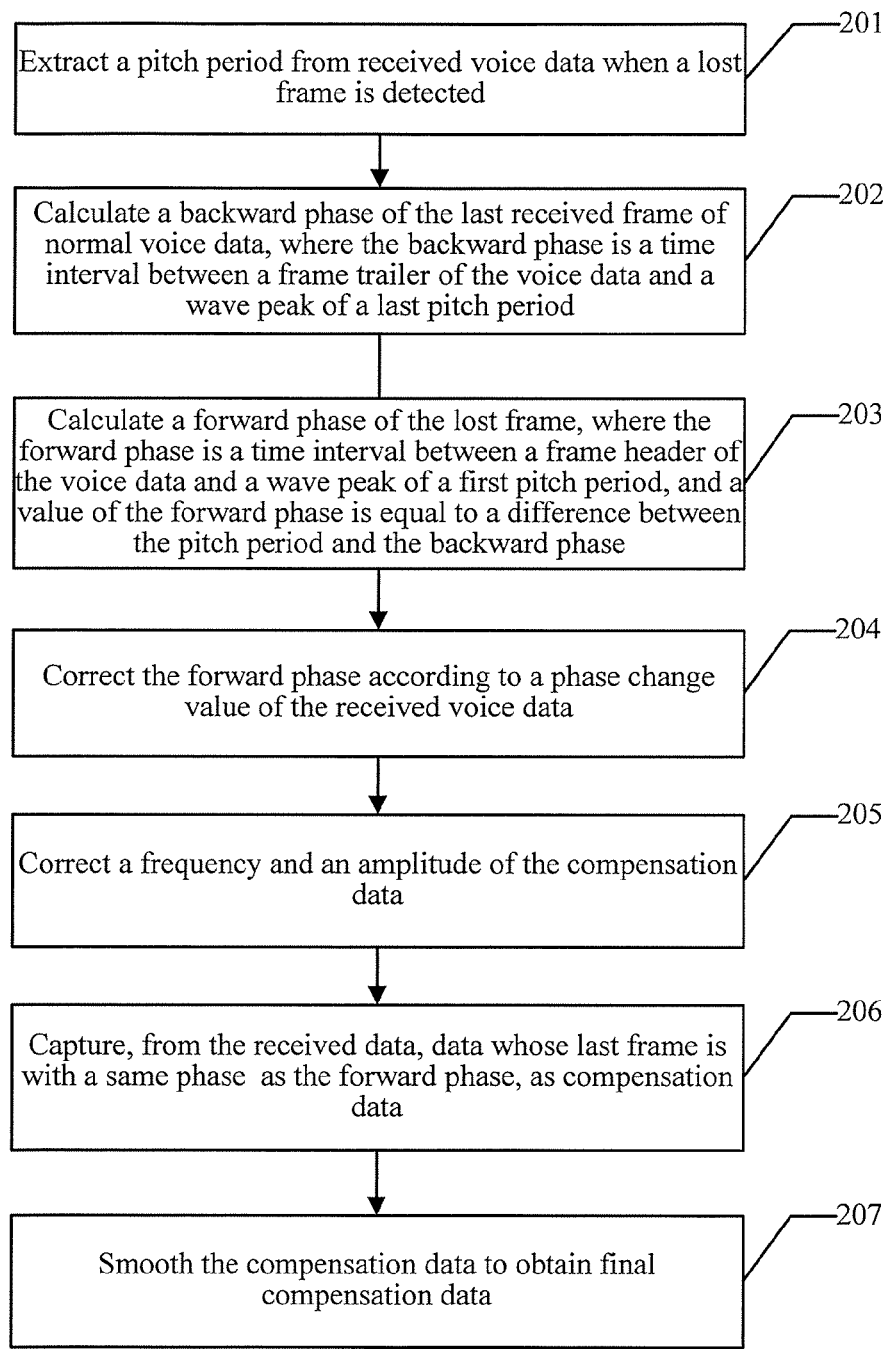
FIG. 3 is a schematic diagram of a method for compensating for a voice packet loss according to another embodiment of the present invention.

For ease of understanding, another embodiment is used in the following to describe in detail the method for compensating for a voice packet loss in the embodiments of the present invention. Referring to FIG. 3, a method for compensating for a voice packet loss according to another embodiment of the present invention includes:

201. Extract a pitch period from received voice data when a lost frame is detected.

202. Calculate a backward phase of a last received frame of normal voice data, where the backward phase is a time interval between a frame trailer of the last received frame and a wave crest of a last pitch period.

203. Calculate a forward phase of the lost frame, where the forward phase is a time interval between a frame header of the lost frame and a wave crest of a first pitch period, and a value of the forward phase is equal to a difference between the pitch period and the backward phase.

204. Correct the forward phase according to a phase change value of the received voice data.

A value of tp is corrected according to the phase change value of the received voice data, where the phase change value reflects a phase change trend. The calculated forward phase tp is corrected according to forward phases of two closest frames.

Further, a correction method may be as follows: A difference between phases of two frames previous to the last frame is added to a current forward phase, so as to obtain a correction value of the current forward phase. Specifically, it is assumed that the forward phases of the previous two frames are tp1 and tp2 respectively, a value of a corrected forward phase is tp'=tp+(tp2−tp1).

205. Correct a frequency and an amplitude of the compensation data.

In this embodiment, a manner of correcting the frequency and the amplitude of the compensation data is the same as the manner of correcting the forward phase of the compensation data in step 204. Specifically, a difference between frequencies of the two frames previous to the last frame of the received data is added to a current frequency, so as to obtain a correction value of the frequency of the compensation data; and a difference between amplitudes of the two frames previous to the last frame of the received data is added to a current amplitude, so as to obtain a correction value of the amplitude of the compensation data.

206. Capture, from the received data, data whose last frame is with a same phase as a corrected forward phase, as the compensation data.

To make the compensation data closer to lost data, data that is closest to the lost data and whose data frame phase is the forward phase tp' is captured from the received data as the compensation data. That is, data whose phase of a last frame is the forward phase tp' is captured from the received data as the compensation data.

207. Smooth the compensation data to obtain final compensation data.

The obtained compensation data is smoothed according to an amplitude at a current moment and a difference value at a frame boundary between the compensation data and a previous frame of data. Specifically, an amplitude at a last point of a frame previous to the compensation data is A0; T is a length of a data frame; N is an adjustable parameter, where 1≤N≤10; t is a time difference from a point of T/N, where 0≤t≤T/N; and the amplitude of the compensation data is A (t) at moment t. A difference value ΔA=A0−A(0) of amplitude exists at a frame boundary between the compensation data obtained in step 206 and the previous frame of data, and the amplitude of smoothed data is A'(t)=A(t)+(ΔA/(T/N)×t).

It should be noted that the compensation data is stored in a data buffer as normally received data. If consecutive packet losses occur subsequently, the compensation data may be taken as benchmark data for obtaining compensation data according to the foregoing steps 201 to 205.

The following table shows effects of actual compensation performed for voice packet losses according to the method for compensating for a voice packet loss in this embodiment. As shown in the table, a mean opinion score (MOS, Mean Opinion Score) is improved greatly.

| Unpredicted MOS Score | MOS Score after Predicted Compensation in This Application | Packet Loss Rate (per mil) |
| --- | --- | --- |
| 3.954 | 3.975 | 5 |
| 3.539 | 3.662 | 10 |
| 2.995 | 3.57 | 20 |
| 3.46 | 3.523 | 30 |
| 3.037 | 3.232 | 40 |
| 2.9616 | 3.212 | 50 |
| 2.749 | 3.159 | 60 |
| 2.559 | 2.868 | 80 |
| 2.521 | 2.895 | 100 |
| 2.011 | 2.669 | 120 |
| 2.035 | 2.642 | 150 |
| 1.922 | 2.532 | 180 |
| 1.721 | 2.423 | 200 |
| 1.465 | 2.246 | 300 |
| 0.787 | 2.114 | 400 |
| 0.491 | 2.026 | 500 |

For different packet loss rates of voice data, an MOS score increases by 0.53 on average. A gain is more obvious for a higher packet loss rate.

In this embodiment of the present invention, when a lost frame is detected, a pitch period is extracted from received voice data; a backward phase to of a last received frame of normal voice data is calculated; a forward phase tp of the lost frame is calculated; the forward phase tp is corrected according to a phase change value of the received data, and a frequency and an amplitude of compensation data are corrected; and data whose last frame is with a same phase as a corrected forward phase tp' is captured from the received data as the compensation data, and the compensation data is smoothed to obtain final compensation data. By performing the foregoing processing for the compensation data, the compensation data becomes closer to lost data, thereby further reducing distortion.

Figure 4:
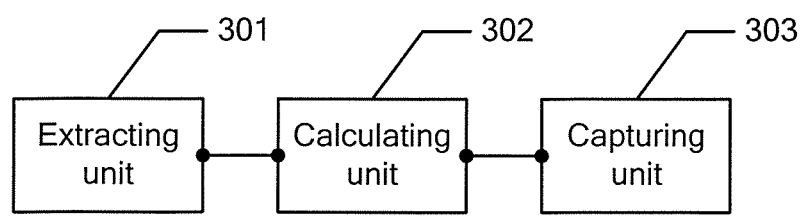
FIG. 4 is a schematic diagram of an apparatus for compensating for a voice packet loss according to an embodiment of the present invention.

The following describes an apparatus for compensating for a voice packet loss in an embodiment of the present invention. Referring to FIG. 4, the apparatus for compensating for a voice packet loss according to this embodiment of the present invention includes:

an extracting unit 301, configured to extract a pitch period from received voice data when a lost frame is detected;

a calculating unit 302, configured to calculate a backward phase of a last received frame of normal voice data, where the backward phase is a time interval between a frame trailer of the last received frame and a wave crest of a last pitch period, where:

the calculating unit 302 is further configured to calculate a forward phase of the lost frame, where the forward phase is a time interval between a frame header of the lost frame and a wave crest of a first pitch period and is equal to a difference between the pitch period and the backward phase; and a capturing unit 303, configured to capture, from the received data, data whose last frame is with a same phase as the forward phase, as compensation data.

In this embodiment of the present invention, for a specific process of implementing a respective function by each unit in the apparatus for compensating for a voice packet loss, reference may be made to specific content of each step in the foregoing embodiments shown in FIG. 1 and FIG. 2. Details are not described herein again.

In this embodiment of the present invention, when a lost frame is detected, an extracting unit 301 extracts a pitch period from received voice data; a calculating unit 302 calculates a backward phase of a last received frame of normal voice data, where the backward phase is a time interval between a frame trailer of the last received frame and a wave crest of a last pitch period; the calculating unit 302 calculates a forward phase of the lost frame, where the forward phase is a time interval between a frame header of the lost frame and a wave crest of a first pitch period and is equal to a difference between the pitch period and the backward phase; and a capturing unit 303 captures, from the received data, data whose last frame is with a same phase as the forward phase, as compensation data. In this way, the forward phase of the lost frame is obtained, and then the compensation data is obtained by means of phase shifting, so that the compensation data is closer to lost data, which reduces voice data distortion without introducing a delay.

Figure 5:
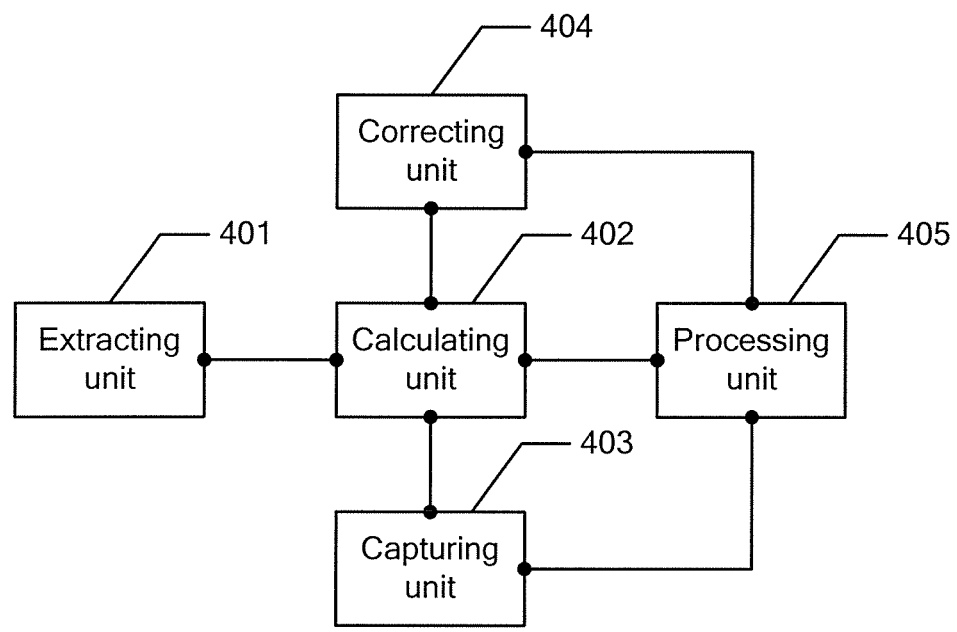
FIG. 5 is a schematic diagram of an apparatus for compensating for a voice packet loss according to another embodiment of the present invention.

For ease of understanding, a schematic diagram of an apparatus for compensating for a voice packet loss according to another embodiment of the present invention is described in detail in the following. Referring to FIG. 5, the apparatus for compensating for a voice packet loss according to this embodiment of the present invention includes:

an extracting unit 401, configured to extract a pitch period from received voice data when a lost frame is detected;

a calculating unit 402, configured to calculate a backward phase of a last received frame of normal voice data, where the backward phase is a time interval between a frame trailer of the last received frame and a wave crest of a last pitch period, where:

the calculating unit 402 is further configured to calculate a forward phase of the lost frame, where the forward phase is a time interval between a frame header of the lost frame and a wave crest of a first pitch period and is equal to a difference between the pitch period and the backward phase; and a capturing unit 403, configured to capture, from the received data, data whose last frame is with a same phase as the forward phase, as compensation data.

It should be noted that the apparatus for compensating for a voice packet loss in this embodiment of the present invention may further include:

a correcting unit 404, configured to correct the forward phase according to a phase change value of the received data, where:

the correcting unit 404 is further configured to correct a frequency and an amplitude of the compensation data.

A correction method is specially as follows: The calculating unit 402 adds the forward phase and a difference between forward phases of two frames previous to the last frame, so as to obtain a correction value of the forward phase; and the calculating unit 402 adds a current frequency and a difference between frequencies of the two frames previous to the last frame, so as to obtain a correction value of the frequency of the compensation data; and adds a current amplitude and a difference between amplitudes of the two frames previous to the last frame, so as to obtain a correction value of the amplitude of the compensation data.

The apparatus for compensating for a voice packet loss in this embodiment of the present invention may further include:

a processing unit 405, configured to smooth corrected compensation data, specifically, to smooth the obtained compensation data according to an amplitude at a current moment and a difference value at a frame boundary between the compensation data and a previous frame of data.

In this embodiment of the present invention, for a specific process of implementing a respective function by each unit in the apparatus for compensating for a voice packet loss, reference may be made to specific content of each step in the foregoing embodiments shown in FIG. 1, FIG. 2, and FIG. 3. Details are not described herein again.

When a lost frame is detected, an extracting unit 401 extracts a pitch period from received voice data; a calculating unit 402 calculates a backward phase of a last received frame of normal voice data and calculates a forward phase of the lost frame; a correcting unit 404 corrects the forward phase according to a phase change value of the received data and corrects a frequency and an amplitude of compensation data; a capturing unit 403 captures, from the received data, data whose last frame is with a same phase as the forward phase, as the compensation data; and a processing unit 405 smooths the compensation data to obtain final compensation data. By performing the foregoing processing for the compensation data, the compensation data becomes closer to lost data, thereby further reducing distortion.

A person skilled in the art may understand that all or a part of the steps of the methods in the embodiments may be implemented by a program instructing relevant hardware. The program may be stored in a computer readable storage medium. The storage medium may include a read-only memory, a magnetic disk, or an optical disc.

The foregoing describes in detail a method and an apparatus for compensating for a voice packet loss according to the present invention. With respect to the implementations and the application scope, modifications may be made by a person of ordinary skill in the art according to the idea of the present invention. Therefore, this specification shall not be construed as a limitation on the present invention.

What is claimed is:

1. A method for acquiring compensation data, the method comprising:

extracting a pitch period from received voice data when a lost frame in the received voice data is detected;

calculating a backward phase of a last received frame of normal voice data in the received voice data, wherein the backward phase is a time interval between an end of the last received frame and a wave crest of a last pitch period of the last received frame, and the last received frame is a last normal frame received before the lost frame;

calculating a forward phase of the lost frame, wherein the forward phase is a time interval between a beginning of the lost frame and a wave crest of a first pitch period of the lost frame, and is calculated as a difference between the pitch period and the backward phase;

correcting the forward phase of the lost frame according to a forward phase change value of the received voice data; and capturing, from the received voice data, data whose last frame is with a same phase as the forward phase, as compensation data.

2. The method according to claim 1, wherein correcting the forward phase according to a phase change value of the received voice data comprises:

adding the forward phase and a difference between forward phases of two frames previous to the last received frame, so as to obtain a correction value of the forward phase.

3. The method according to claim 1, wherein after correcting the forward phase according to a phase change value of the received voice data, the method comprises:

correcting a frequency and an amplitude of the compensation data.

4. The method according to claim 3, wherein correcting a frequency and an amplitude of the compensation data comprises:

adding a frequency of the compensation data at a current moment in time and a difference between frequencies of the two frames previous to the last frame, so as to obtain a correction value of the frequency of the compensation data; and adding an amplitude of the compensation data at the current moment in time and a difference between amplitudes of the two frames previous to the last frame, so as to obtain a correction value of the amplitude of the compensation data.

5. The method according to claim 3, wherein after correcting the frequency and the amplitude of the compensation data, the method comprises:

smoothing an amplitude of the corrected compensation data according to an amplitude of the compensation data at a current moment in time and a difference value at a frame boundary between the compensation data and a frame previous to the compensation data.

6. An apparatus, comprising: a processor and a memory, wherein the memory stores instructions, the processor communicates with the memory when the apparatus runs, and the processor executes the instructions to cause the apparatus to perform the following:

extracting a pitch period from received voice data when a lost frame in the received voice data is detected;

calculating a backward phase of a last received frame of normal voice data in the received voice data, wherein the backward phase is a time interval between an end of the last received frame and a wave crest of a last pitch period of the last received frame, and the last received frame is a last normal frame received before the lost frame;

calculating a forward phase of the lost frame, wherein the forward phase is a time interval between a beginning of the lost frame and a wave crest of a first pitch period of the lost frame, and is calculated as a difference between the pitch period and the backward phase;

correcting the forward phase of the lost frame according to a phase change value of the received voice data; and capturing, from the received voice data, data whose last frame is with a same phase as the forward phase, as compensation data.

7. The apparatus according to claim 6, wherein the apparatus is further caused to perform:

adding the forward phase and a difference between forward phases of two frames previous to the last received frame, so as to obtain a correction value of the forward phase;

adding a frequency of the compensation data at a current moment in time and a difference between frequencies of the two frames previous to the last frame, so as to obtain a correction value of the frequency of the compensation data; and adding an amplitude of the compensation data at a current moment in time and a difference between amplitudes of the two frames previous to the last frame, so as to obtain a correction value of the amplitude of the compensation data.

8. The apparatus according to claim 6, wherein the apparatus is further caused to perform:

correcting a frequency and an amplitude of the compensation data.

9. The apparatus according to claim 8, wherein the apparatus is further caused to perform:

smoothing an amplitude of the corrected compensation data according to an amplitude of the compensation data at a current moment in time and a difference value at a frame boundary between the compensation data and a frame previous to the compensation data after correcting the frequency and the amplitude of the compensation data.

* * * * *